United States Patent [19]

Yamawaki et al.

[11] 3,909,281

[45] Sept. 30, 1975

[54] PROCESS FOR PREPARING A CARBON BLACK COMPOSITION

[75] Inventors: Takeshi Yamawaki, Yokohama; Tatsuo Masuko, Yokkaichi; Osami Yanagida, Yokkaichi; Syunji Yamamoto, Yokkaichi; Jihei Inomata, Komae; Susumu Michishima, Yokohama, all of Japan

[73] Assignee: Mitsubishi Chemical Industries, Ltd., Tokyo, Japan

[22] Filed: Feb. 4, 1974

[21] Appl. No.: 439,027

[30] Foreign Application Priority Data

Feb. 6, 1973 Japan.............................. 48-15079
Sept. 19, 1973 Japan............................ 48-105784
Oct. 19, 1973 Japan............................ 48-117673

[52] U.S. Cl. ............. 106/285; 106/307; 106/308 Q
[51] Int. Cl.² ..................... C09D 3/00; C08K 3/04
[58] Field of Search ............... 106/285, 287 R, 307; 260/42.55, 94.7 A

[56] References Cited

UNITED STATES PATENTS

| | | | |
|---|---|---|---|
| 3,449,284 | 6/1969 | Pollock............................ | 260/42.55 |
| 3,463,755 | 8/1969 | Forrester et al. ................ | 260/42.55 |
| 3,790,549 | 2/1974 | Feniak........................... | 260/94.7 A |

*Primary Examiner*—Melvyn I. Marquis
*Assistant Examiner*—H. H. Fletcher
*Attorney, Agent, or Firm*—Oblon, Fisher, Spivak, McClelland & Maier

[57] ABSTRACT

A process for preparing a carbon black liquid rubber composition in which the carbon black is highly dispersed in a liquid rubber which comprises admixing an aqueous slurry of carbon black and liquid rubber by stirring. A granulated carbon black liquid rubber composition is obtained when the stirring is performed under moderate shearing conditions.

13 Claims, No Drawings

PROCESS FOR PREPARING A CARBON BLACK COMPOSITION

BACKGROUND OF THE INVENTION

1. Field of the Invention:

This invention relates to a process for preparing a composition of carbon black and liquid rubber. More particularly, the invention relates to a process of mixing an aqueous slurry of carbon black.

2. Description of the Prior Art:

Liquid rubber has superior moldability, processability, continuous operability, and the like in comparison with conventional solid rubbers and can be converted to a cured solid rubber by heating with a curing agent. Carbon black is conventionally combined with liquid rubber as a reinforcing filler or ultraviolet ray absorber. It is necessary to uniformly disperse or blend the carbon black in the liquid rubber before curing the liquid rubber. Methods of blending carbon black with the liquid rubber, include mechanical blending by a flat stone mill, a corn mill, a gyrator mill, a roller mill, continuous mixer (manufactured by RAPRA), ball mill, paint roll mill (three rollers), or the like.

However, it is relatively difficult to disperse the carbon black uniformly by these conventional methods and in fact, it is necessary to repeat the dispersing operations many times and to use high powered severe stirring whereby the cost of the operation is disadvantageously high.

A need exist therefore, for a method which readily uniformly disperse carbon black into liquid rubber.

SUMMARY OF THE INVENTION

Accordingly, one object of this invention is to provide a process for preparing a carbon black composition in which the carbon black is highly dispersed in liquid rubber or the like by an economical operation which does not require high power consumption.

Another object of this invention is to overcome the disadvantages of the conventional dry blending method which mechanically blends carbon black and liquid rubber.

Briefly, these and other objects of the invention as hereinafter will become apparent are achieved by preparing a carbon black aqueous slurry and stirring a mixture of the aqueous slurry of carbon black and the liquid rubber to obtain a carbon black liquid rubber composition in which carbon black is uniformly dispersed.

DETAILED DESCRIPTION OF THE PREFERRED EMBODIMENTS

The liquid rubbers those which have a high viscosity and fluidity at temperatures less than 100°C and particularly a viscosity of 0.3–1000 poise, preferably 3–500 poise at room temperature.

The liquid rubbers include polymers which have low molecular weight ranging from 500–30000, preferably 1000–20000. The low molecular weight polymers include conjugated diene type polymers which may be prepared by known processes. The conjugated diene type monomers include butadiene, isoprene, chloroprene, pentadiene, or the like. Vinyl type monomers e.g. styrene, isobutylene, acrylonitrile, acrylate, methacrylate, alkyl vinyl ether, or the like can be added as a comonomer. The known polymerization methods include radical polymerization, anion polymerization, emulsion polymerization, solution polymerization, or the like.

The low molecular weight polymers can have a terminal functional group as a result of the polymerization reactions. The functional groups include hydroxyl, carboxyl, sulfonic acid, epoxy, amino, thiol groups and the like. The functional group can be introduced by the radical polymerization of a diene type and/or a vinyl type monomer using an azobis type catalyst having suitable functional group or a hydroperoxide. Also included is the method of living polymerizing said monomer in the presence of an alkali metal catalyst and then reacting an epoxy compound (ethyleneoxide, epichlorohydrine, or the like), carbon dioxide or an aldehyde with the polymer. The low molecular weight polymers can be hydrogenataed in the main chain if necessary, for use in the invention. As a hydrogenating catalyst, nickel, palladium, ruthenium, rodium, or the like can be used.

The aqueous carbon black slurry can be prepared by dispersing carbon black in water in the conventional manner. The carbon black which can be used in the present invention includes any grade such as:

SAF Supper abrasion furnace black;
ISAF Intermediate super abrasion furnace black;
HAF High abrasion furnace black;
FF Fine furnace black;
FEF Fast extrusion furnace black;
GPF General purpose furnace black;
HPC Hard processing channel black;
EPC Easy processing channel black;
FT Fine thermal black; or
MT Medium thermal black.

The forms of the carbon black used may vary and include carbon black powders, pellets, and soft and hard beads.

The aqueous carbon black slurry can be prepared by mixing 2–20 wt. %, preferably 5–10 wt. %, (wt. % is wt. % of carbon black to water) with water.

A high shearing type disperser such as a colloidal mill, a homogenizer, a turbine mixer, or the like can be employed as the mixer.

Various concentrations of carbon black compositions can be prepared by a proper selection of the ratio of carbon black to liquid rubber. The forms of the carbon black composition can be changed by selecting the amount of carbon black used and the mixing conditions. These factors are important characteristics of the invention.

In the invention 30–300 parts by weight of carbon black to 100 parts by weight of the liquid rubber are used. When 80–300 parts by weight, preferably 90–150 parts by weight, of carbon black is mixed as an aqueous slurry with 100 parts by weight of the liquid rubber, a granular composition of carbon black and liquid rubber may be formed. It should be emphasized that a granular composition of carbon black and liquid rubber is obtained by using an extremely high content of of carbon black (80–300 parts by weight to 100 parts by weight of liquid rubber). The process for preparing a granular composition of carbon black and liquid rubber using 80–300 parts by wt. of carbon black to 100 parts by wt. of the liquid rubber will be illustrated in detail hereinafter.

If the carbon black content is less than 80 parts by wt. to 100 parts by wt. of the liquid rubber, the granulation of the product is slightly hard. On the other hand, if the carbon black content is too large, although the granulation can be performed, a large amount of free carbon black which is not absorbed nor adsorbed in the liquid rubber remains in the water phase which is separated after stirring. Accordingly, it is necessary to separate and recover the free carbon black from this phase. The content of carbon black depends upon the particle diameter of the carbon black or on the dispersing rate of carbon black in the aqueous carbon black slurry or on the desired size of the granular composition, and it is selected from this range.

In general, when carbon black having a fine size is used, the rubber composition preferably has a lower content of carbon black. On the other hand, if a carbon black having a large size is used, the rubber composition preferably has a higher content of carbon black. For example, the preferred content of SAF carbon black which has a fine size (15–30 m$\mu$) is 80–100 parts by wt. to 100 parts by wt. of the liquid rubber. The preferred content of GPF carbon black which has a large size (50–80 $\mu$) is 100–150 parts by wt. to 100 parts by wt. of the liquid rubber. If the carbon black content is high, the particle size of the resulting granular composition is small, and if the carbon black content is low, the particle size of the resulting granular composition is large.

Generally, it is preferable to adjust the content of carbon black so as to form a granular composition having a diameter of 0.1–20 mm, preferably from 0.2–5 mm. When the viscosity or tackiness of the liquid rubber is low, it is preferable to use a higher content of carbon black to form a suitable granular condition, and when it is high, it is preferable to use a lower content of carbon black.

The temperature during the granulation affects the viscosity of the liquid rubber. It is affected by the content of carbon black and it is optimum at room temperature to 90°C for preparing the desired granular composition.

conventional stirring methods may be used in the mixing of the aqueous carbon black slurry with the liquid rubber such as by using a homogenizer. The mixing conditions can vary and may be performed at from room temperature to a high temperature and under atmospheric pressure or high pressure. The rotary speed of the stirring can be selected from the range of 500–20000 r.p.m. and is related to the content of the carbon black. After stirring the mixture is completed, the granular composition of carbon black and liquid rubber is separated from the water phase by any suitable technique, such as sedimentation, i.e. allowing the mixture to remain quiescent.

As noted, the particle size of the granular composition depends upon the content of carbon black, the property of the liquid rubbers, the rotary speed of the stirrer, or the like. Usually, the conditions are controlled so as to obtain a granular composition having a particle diameter of 0.1–20 mm. The resulting granular composition can be easily separated by the conventional separating methods, e.g. filtration, centrifugal separation, or the like. The granular composition separated from the water can also be dried in necessary. The drying method will be illustrated later.

The granular composition of carbon black and liquid rubber prepared by the process of this invention contains 80–300 parts by wt. of carbon black to 100 parts by wt. of the liquid rubber. The content of carbon black contained in the liquid rubber prepared by this invention is relatively higher than that of the conventional process; that is, it is a high carbon black content composition. Accordingly, when a composition having a lower content of carbon black is desired, it is possible to dilute the composition with the same liquid rubber. In some cases, it is possible to modify the composition by dilution with a different liquid rubber. The dilution can be performed anytime after the separation of the water phase. It is also possible to perform the dilution at the time of drying or after drying.

The composition prepared by diluting the high carbon black content composition has a high dispersing rate of carbon black which is the same as that of the composition prepared directly without a dilution technique.

The process for preparing a granular composition by using a high content of carbon black to the liquid rubber, has been illustrated. However, a granular composition can be also prepared by decreasing the content of carbon black to the liquid rubber under certain predetermined stirring conditions.

The granulation process will be illustrated in detail as follows. In the granulation, 100 parts by wt. of the liquid rubber are added to the aqueous carbon black slurry containing 30–80 parts by wt. of carbon black and the mixture was stirred under moderate shearing conditions exerted by the stirrer having a peripheral speed of 0.9–6.0 m/sec., However, when the carbon black content is less than 30 parts by wt., the carbon black content to the liquid rubber is insufficient and the composition is the form of a paste having thixotropic properties and is not in a granular form.

Stirring of the mixture under shearing conditions will now be illustrated. The factors which influence the stirring include the peripheral speed of the blades of the stirrer; the rotary speed of the stirrer, the temperature during stirring; the time for stirring; the shape and number of blades of the stirrer; the ratio of the size of blades to the size of vessel; Reynold's number in a vessel during the stirring, and the like. These factors, except for the peripheral speed are not important and may vary.

It has been found that the only stirring factor which is important for granulation is the peripheral speed of the blades of the stirrer. The peripheral speed of the blades of the stirrer is given by the equation of $$Vt = \pi nd$$

wherein
  Vt: peripheral speed (m/sec.) (speed at the top of blade of stirrer)
  $n$: rotary speed of the stirrer (r.p.s.)
  $\pi$: ratio of circumference
  $d$: diameter of the blade As it is clear from the above equation, the peripheral speed of the blade is given by the rotary speed of the stirrer and the diameter of the blade. The two factors have a mutual relationship and accordingly, it is difficult to determine the peripheral speed of the blade when considering only one factor. However, it is possible to determine the peripheral speed when several mutual factors are considered. For example, when the diameter of the stirrer blade is 0.05 m, it is necessary that the rotary speed be in the range of 350–2300 r.p.m. for a peripheral speed of 0.9–6.0 m/sec. When the diameter of the stirrer blade is 0.3 m, it is necessary that the rotary speed be in a range of from 57–380 r.p.m. for a peripheral speed 0.9–6.0 m/sec.

In the process for preparing a granular composition containing 30–80 parts by wt. of carbon black to 100 parts by wt. of liquid rubber, it is important of mix (stir) the liquid rubber and a predetermined amount of aqueous carbon black slurry under mild shearing conditions at a peripheral blade speed of 0.9–6.0 m/sec.

The mechanism of granulation of the composition of carbon black and liquid rubber under these conditions is considered to be as follows. When a mixture of the water insoluble liquid rubber and the aqueous slurry of carbon black remain still, the liquid rubber forms an upper phase and the aqueous carbon black slurry forms a lower phase. When the two phases are slowly stirred by a stirrer in this manner, the liquid rubber forms particles having a certain size which are dispersed in the carbon black slurry so that the carbon black is adsorbed or adsorbed on the surface of the liquid rubber particles. The concentration of carbon black on the particle surface thus formed is relatively high so that no viscosity is found. Accordingly, the adhesion or coagulation between the particles or the adhesion of particles to a wall of tank is inhibited. As stated above, it is necessary to stir them under mild shearing conditions in the granulation method.

If the shearing force of the stirring is too high, the composition is not easily granulated to a suitable granular composition. Even though a granular composition is temporarily formed, the adhesion between the particles or the adhesion of particles and the apparatus is promoted to form a paste composition having high tackiness for a short time because of severe collisions between the particles or between the particles and the stirrer. This adhesive phenomenon is remarkable when the ratio of carbon black to liquid rubber is low.

On the other hand, when the shearing force is too low, the liquid rubber is not uniformly mixed with the aqueous carbon black slurry whereby a long time is required for the granulation or granulation is not obtained. As stated above, there are two methods for preparing a granular composition of carbon black and liquid rubber. The invention is not limited to these methods.

When the liquid rubber and the aqueous slurry containing 30–80 parts by wt. of carbon black to 100 wt. parts of the liquid rubber are stirred under mild shearing conditions, the granular composition of carbon black and liquid rubber is obtained. However, as noted if they are mixed while being stirred at a peripheral speed over 6.0 m/sec., the composition is not granulated. When less than 30 parts by wt. of carbon black to 100 parts by wt. are used, it is hard to granulate the composition by controlling the stirring conditions. The carbon black composition, which is not in a granular form, is in a paste form which has thixotropic properties. Accoordingly, the paste composition adheres to the stirrer and the inner walls of the tank whereby the stirring operation and the following handling such as a discharge from the tank, dehydration, drying, or the like are more difficult. However, on a small batch scale, this is not a substantial disadvantage. On the other, when the composition is continuously prepared on a large scale, the granulation technology is quite important from the viewpoint of chemical engineering.

The drying of the composition of the invention will now be illustrated. As stated above, the invention effectively utilizes water as a medium in the uniform mixing of the liquid rubber and carbon black. The resulting composition therefore usually contains from 1–50 wt. % especially 10–40 wt. % of water. When the composition is granulated the drying is remarkable easy and conventional drying methods such as hot air drying, flow drying or the like may be used.

When the composition is in a paste form, however, it is preferable to employ a liquid surface refreshing type evaporator (dryer), which is a thin film type dryer for drying the material as a thin membrane under scrubbing conditions or a vacuum deaerator type dryer which forcibly changes the level of the liquid surface. In practice, thin film evaporators, centrifugal thin film continuous evaporators, surface scrubbing heat-exchange type continuous reactors, kneader mixers and vacuum deaerators or the like can be used for drying.

The drying temperature may vary but is usually from room temperature to about 120°C, preferably from 50°–100°C. The drying is preferably performed rapidly in vacuum or under normal pressure.

The liquid surface refreshing evaporator embodiments are illustrated as a method for drying the carbon black composition in paste form. However, the liquid surface refreshing evaporator can also be used for a dilution or a modification at the time of drying or after the drying. For example, when the granular composition of carbon black is prepared by using a large amount of carbon black in comparison with the conventional ratio of blending, it is possible to adjust the ratio of the blend by mixing the composition with a desired amount of the same or a different liquid rubber, and then drying them. That is, the composition which contains a large amount of carbon black can be used as a master batch for preparing a composition of liquid rubber and carbon black having any predetermined desired concentration of carbon black.

The composition of carbon black and liquid rubber of the invention can be used for various applications. For example, it is possible to prepare cured products having various physical properties by mixing the composition with various additives such as curing agents, catalyst, fillers, or the like so as to cause a crosslinking reaction. The curing agents and other additives used have a close relationship with the functional group of the polymer. For example, polyisocyanates, polyfunctional acid anhydrieds, epoxy compounds, polyols, polyamines, quinodioxime, sulfur, lead aeroxide, calcium peroxide, chromium peroxide, etc. may be effectively used.

Carbon black is uniformly dispersed in the compositions and accordingly, the properties of the cured product prepared from these compositions are excellent especially with respect to mechanical strength. This invention has various advantages including:

1. the ease of mixing the aqueous carbon black slurry and liquid rubber for a short time compared with those of the conventional mechanical kneading method;
2. the prevention of loss of the liquid rubber from the mixing system while stirring.
3. the blending of all the liquid rubber with a specific amount of carbon black;
4. imparting a high dispersing rate of carbon black in the granular composition;
5. the lack of tackiness when the composition is granulated under specified conditions;

6. The ability to discharge and transfer the mixture easily by a simple method e.g. an overflow from the tank having the stirrer;

7. avoiding consideration of the viscosity problem in the transfer;

8. the ability to easily separate the liquid rubber composition from most parts of the water by conventional methods;

9. a remarkable decrease in the load in the drying step and the ability to carry out a completely continuous process readily.

According to the process of the invention it is quite advantageous in the industrial processing for the production of a composition of liquid rubber and carbon black.

Having generally described in the invention, a more complete understanding can be obtained by reference to certain specific examples, which are include for purposes of illustration only and are not intended to be limiting unless otherwise specified. In the Examples, the term of "parts" means "part by weight". The liquid rubber used in the Examples are shown in Table 1. The terms of TES, EL, and HD represent tensile strength, elongation and hardness of the cured product. The term of LR represents liquid rubber.

a 10–100 mesh were charged and stirred vigorously at 10,000 r.p.m. for 10 minutes to obtain an aqueous carbon black slurry. 50 g of Liquid rubber No. 2 (CN-15) was added to the aqueous carbon black slurry and the mixture was stirred at 10,000 r.p.m. for 5 minutes to obtain a granular composition of carbon black and liquid rubber having a particle diameter of from 0.1–0.5 mm. The granular composition had substnatially no tackiness and was filled with bubbles resulting from the severe stirring which floated on the surface of the water because the specific gravity was apparently less than 1. The granular composition was filtered through a wire gauze of 150 mesh, and then the water contained in the granules was evaporated by aspiration through a $G_2$ glass filter. The water in the granules was about 15–20%.

The granules were then transferred to a multi-purpose mixer (its blade was set both to revolve around the center of the mixer and on its axis) and 30 g of Liquid rubber No. 2 was further added to dilute the carbon black content (from 80 parts to 50 parts of carbon black to 100 parts Liquid rubber No. 2). The mixture was stirred at 70°C under a reduced pressure of 20 mm Hg for 3 hours to dry the mixture. The water content of the product was less than 0.01% as determined by

TABLE 1

| Liquid rubber Type of liquid rubber | Polymer | Functional Group | Viscosity (30°C) poise | Average Molecular Weight *3 |
|---|---|---|---|---|
| Liquid rubber No. 1 (R-45 HT*1) | polybutadiene | OH | 50 | 2600 |
| Liquid Rubber No. 2 (CN-15) | butadiene-acrylonitrile copolymer (85:15) | OH | 460 | 3000 |
| Liquid rubber No. 3 (CS-15) | butadiene-styrene copolymer (75:25) | OH | 320 | 2800 |
| Liquid rubber No. 4 (R-45HT hydrogenated product) *2 | polybutadiene | OH | 45 (at 80°C) | 3000 |
| Liquid rubber No. 5 (Hycar 1312) | butadiene-acrylonitrile copolymer | None | 1200 | 1800 |
| Liquid rubber No. 6 (Thiokol LP 32) | polydisulfide bi-(oxyethylene methane) | SH | 270 | 4000 |
| Liquid rubber No. 7 (Lithene PL) | polybutadiene | None | 1.3 | 1300 |
| Liquid rubber No. 8 (Lithene AM) | polybutadiene | None | 320 | 1200 |

*1 about 2.3 OH/1 molecule
*2 the resin was hydrogenated to a degree of more than 95% in the presence of nickel catalyst
*3 the average molecular weight was measured by Vapor pressure osmometry.

The dispersing rate of carbon black was measured by the microscopic method stated in the Journal of Nippon Rubber Association Vo. 41 No. 4 page 338–345 (1968) under the following equation.

$$\text{dispersing rate} = 1 - \frac{\text{lattice number of carbon black}}{\text{total lattice number}} \times 100(\%)$$

EXAMPLE 1

In a 1.5 liter mixer used for preparing juice, 500 g of water and 40 g of SAF carbon black hard beads having the Carl Fischer method. The dispersing rate of carbon black in Liquid rubber No. 2 was 99.9%.

EXAMPLE 2

The process of Example 1 was followed by adding 90 g, 100 g, 110 g 120 g or 130 g of HAF hard beads having a mesh of 10–100 to 800 g of water in the mixer whereby a series of aqueous carbon black slurries were obtained. 100 g of Liquid rubber No. 1 (R-45HT) was added to each aqueous carbon black slurry and the mixture was stirred at 10,000 r.p.m. for 5 minutes to obtain a granular composition of carbon black and liquid rubber. The properties of the granular compositions are shown in Table 2.

TABLE 2

| No. | Carbon black (parts to 100 parts of LR). | Particle diameter of granules (mm) | Properties of granular composition |
|---|---|---|---|
| 1 | 90 | 0.2–0.4 | granules; transparent water phase; |
| 2 | 100 | 0.2–0.4 | no tackiness |
| 3 | 110 | 0.1–0.3 | small granules; transparent water phase; |
| 4 | 120 | 0.05–0.1 | no tackiness |
| 5 | 130 | 0.02–0.1 | fine granules; no tackiness |

As shown in Table 2, the size of the particles of the granular composition was decreased depending upon the increase of carbon black content to the liquid rubber content. The ratio of carbon black to the liquid rubber may vary and can be decided by consideration of the operation and such economic factors as filtration, dehydration, drying and mixing. Generally, it is preferable to mix about an equal weight of both components.

EXAMPLE 3

In a beaker having a 120 mm diameter, Liquid rubber No. 1 (R-45HT) and an aqueous carbon black slurry containing 7.4% of HAF hard beads of carbon black prepared in accordance with the procedure of Example 1, were charged to the depth of 150 mm. A turbine stirrer having a diameter of 50 mm which has a 45° angle of torsion was placed in the center, 50 mm from the bottom (⅓ of the depth) and was slowly stirred at 600 r.p.m. to obtain a granular composition of carbon black and liquid rubber. The results are shown in Table 3.

The stirring speed was a slow speed of 600 r.p.m. in comparison to the speed of Example 1. The particle size also decreases depending upon the increase in carbon black content.

EXAMPLE 4

The process of Example 3 was followed at a temperature of 24°C, 50°C and 70°C. The results are shown in Table 4.

TABLE 4

Affect of granulation temperature:

| No. | Carbon black (parts to 100 parts of LR) | Granulation temperature (°C) | Time for granulation (min.) | Particle diameter (mm) | Viscosity at granulation temperature (poise) |
|---|---|---|---|---|---|
| 11 | 100 | 24 | 50 | 0.1–2 | 66 |
| 12 | 100 | 50 | 40 | 0.2–2 | 20 |
| 13 | 100 | 70 | 30 | 0.3–2 | 7.8 |

When the granulation temperature was high, the time for granulation was shortened and the particle size was increased.

EXAMPLE 5

The process of Example 3 was followed except that the type of Liquid rubber, carbon black content (parts to 100 parts of liquid rubber), granulation temperature and time for granulation were as shown in Table 5 to obtain a granular composition of carbon black and liquid rubber.

TABLE 3

| No. | Carbon Black (parts to 100 parts of LR) | Time for granulation (min.) | Particle diameter (mm) | Properties of granular composition |
|---|---|---|---|---|
| 6 | 80 | 40 | 0.2–3 | |
| 7 | 100 | 50 | 0.1–2 | particle size decreases depending upon increase of carbon black content; |
| 8 | 120 | 60 | 0.1–2 | no tackiness, no free carbon |
| 9 | 150 | 90 | 0.1–2 | |
| 10 | 200 | 120 | 0.1–1 | free carbon remains partially; fine particles |

TABLE 5

| No. | Liquid rubber | Carbon black (parts to 100 parts of LR) | Granulation temperature (°C) | Time for granulation (min.) | Particle diameter (mm) | Viscosity (poise) |
|---|---|---|---|---|---|---|
| 14 | Liquid rubber No. 2 (CN-15) | 100 | 70 | 90 | 0.1–2.0 | 53 |
| 15 | Liquid rubber No. 3 (CS-15) | 100 | 24 | 105 | 0.5–3.0 | 440 |
| 16 | Liquid rubber No. 4 (R-45HT hydrogenated) | 80 | 80 | 15 | 1.0–3.0 | 50 |
| 17 | Liquid rubber No. 5 (Hycar 1312) | 80 | 70 | 10 | 1.0–5.0 | 56 |

TABLE 5 -Continued

| No. | Liquid rubber | Carbon black (parts to 100 parts of LR) | Granulation temperature (°C) | Time for granulation (min.) | Particle diameter (mm) | Viscosity (poise) |
|---|---|---|---|---|---|---|
| 18 | Liquid rubber No. 6 (Thiokol LP 32) | 80 | 24 | 90 | 0.1–1.0 | 400 |
| 19 | Liquid rubber No. 7 (Lithene PL) | 100 | 23 | 120 | 1.0–6.0 | 0.18 |
| 20 | Liquid rubber No. 8 (Lithene AM) | 80 | 50 | 15 | 0.1–4.0 | 56 |

EXAMPLE 6

A beaker have a 120 mm diameter and a depth of 200 mm equipped with a turbine stirrer having a diameter of 50 mm which has 6 blades each having a 45° angle of torsion and a size of 10 mm x 10 mm, was employed. In this beaker, 100 parts of Liquid rubber No. (R-45HT) and a 7% aqueous carbon black slurry containing 50 parts of carbon black were charged to a depth of 150 mm and the mixture was stirred at room temperature at each of the speeds shown in Table 6. The granular compositions of carbon black and liquid rubber shown in Table 6 were obtained.

TABLE 6

| No. | Rotary Speed (r.p.m.) | Peripheral speed (m/sec.) | Time for granulation (min.) | Particle Diameter (mm) |
|---|---|---|---|---|
| 21 | 600 | 1.57 | 30 | 4–6 |
| 22 | 800 | 2.09 | 20 | 4–6 |
| 23 | 1000 | 2.62 | 20 | 4–6 |
| 24 | 2000 | 5.23 | 30 | 0.2–2 |

EXAMPLE 7

Using the apparatus of Example 6, 100 parts of each liquid rubber shown in Table 7 and a 7% aqueous carbon black slurry containing 30, 50, 60 and 70 parts of carbon black were charged at room temperature and each mixture was stirred at 600 r.p.m. and a peripheral speed of 1.57 m/sec., to obtain granular compositions of carbon black and liquid rubber shown in Table 7.

TABLE 7

| No. | Liquid rubber | Carbon black (parts to 100 parts of LR) | Time for granulation (min.) | Particle diameter (mm) |
|---|---|---|---|---|
| 25 | Liquid rubber No. 1 (R-45HT) | 30 | 15 | 4–6 |
| 26 | Liquid rubber No. 2 (CN-15) | 30 | 30 | 5–6 |
| 27 | Liquid rubber No. 1 (R-45HT) | 50 | 30 | 4–6 |
| 28 | Liquid rubber No. 2 (CN-15) | 50 | 30 | 5–6 |
| 29 | Liquid rubber No. 1 (R-45HT) | 60 | 30 | 3–5 |
| 30 | Liquid rubber No. 1 (R-45HT) | 70 | 35 | 2–4 |

EXAMPLE 8

Using the appartaus of Example 6, 100 parts of Liquid rubber No. 1 (R-45HT) and a 7% aqueous carbon black slurry containing 50 or 70 parts were charged and the mixture was stirred at 24°C or 50°C at 600 r.p.m. and a peripheral speed of 1.57 m/sec. to obtain the granular compositions of carbon black and liquid rubber. The viscosity of Liquid rubber No. 1 was 66 poise at 24°C and 20 poise at 50°C. The results are shown in Table 8.

TABLE 8

Effect of Granulation temperature:

| No. | Carbon black (parts to 100 parts of LR) | Granulation temperature (°C) | Time for granulation (min.) | Particle diameter (mm) |
|---|---|---|---|---|
| 31 | 50 | 24 | 30 | 4–6 |
| 32 | 50 | 50 | 15 | 4–6 |
| 33 | 70 | 24 | 35 | 2–4 |
| 34 | 70 | 50 | 20 | 2–6 |

As shown in Table 8, the time for granulation is shortened by raising the granulation temperature as the viscosity of liquid rubber is decreased. When the granulation temperature is high and the content of carbon black is high, a granular composition of carbon black and liquid rubber which is easily handled is obtained. Accordingly, the granulation temperature should be selected depending upon the content of carbon black.

EXAMPLE 9

The apparatus used in Example 6 was modified by changing the turbine stirrer (shape and diameter) as shown in Table 9. 100 parts of Liquid rubber No. 1 (R-45HT) and a 7% aqueous carbon black slurry containing 70 parts of carbon black were charged in each apparatus having various blade shapes and stirred under the conditions shown in Table 9 to obtain the granular compositions of carbon black and liquid rubber as shown in Table 9.

The influence of the shape of blade on the condition of granulation was not great. However, when an anchor shape blade having a large diameter is used, it is preferable to decrease the rotary speed to obtain a good granular composition.

TABLE 9

Shape of Blade:

| No. | Shape of Blade | Blade diameter (mm) | Rotary speed (r.p.m.) | Peripheral speed (m/sec.) | Time for granulation (min.) | Particle diameter (mm) |
|---|---|---|---|---|---|---|
| 35 | 45° angle of torsion | 50 | 600 | 1.57 | 35 | 2–4 |
| 36 | propeller | 50 | 600 | 1.57 | 40 | 3–5 |
| 37 | flat turbine | 50 | 600 | 1.57 | 30 | 1–3 |
| 38 | anchor | 90 | 200 | 0.94 | 30 | 1–3 |

EXAMPLE 10

The apparatus of Example 6 was modified by changing the location of the stirrer. 100 parts of Liquid rubber No. 1 (R-45HT) and a 7% carbon black aqueous slurry containing 50 parts or 70 parts of carbon black as shown in Table 10 were charged and the mixture was stirred at 600 r.p.m. and peripheral speed of 1.57 m/sec., to obtain granular compositions of carbon black and liquid rubber shown in Table 10. In Table 10, $l$ represents the length from the bottom of the beaker to the location of the stirrer and L represents the depth of the mixture. Two blades are used in Experiment No. 39.

TABLE 10

| No. | Place of Blade: Carbon black (parts to 100 parts of LR) | Place of blade l/L (cm) | Time for granulation (min.) | Particle diameter (mm) |
|---|---|---|---|---|
| 39 | 50 | 5/15 ; 10/15 | 20 | 3–5 |
| 40 | 70 | 2/15 | 30 | 0.1–4 |
| 41 | 70 | 8/15 | 20 | 0.1–4 |
| 42 | 70 | 10/15 | 30 | 0.1–3 |

EXAMPLE 11

The process of Example 6 was modified by changing the type of Liquid rubber, content of carbon black (parts to 100 parts of LR), granulation temperature, time for granulation, and rotary speed (peripheral speed), to obtain granular compositions of carbon black and liquid rubber. The results are shown in Table 11.

TABLE 11

| No. | Liquid rubber | Carbon black (parts) | Rotary speed (r.p.m.) | Peripheral speed (m/sec.) | Granulation temperature (°C) | Viscosity (poise) * | Time for granulation (min.) | Particle diameter (mm) |
|---|---|---|---|---|---|---|---|---|
| 43 | Liquid rubber No. 3 | 50 | 600 | 1.57 | 26 | 380 | 30 | 4–6 |
| 44 | Liquid rubber No. 4 | 70 | 600 | 1.57 | 80 | 45 | 15 | 1–5 |
| 45 | Liquid rubber No. 5 | 70 | 600 | 1.57 | 70 | 54 | 10 | 1–5 |
| 46 | Liquid rubber No. 6 | 55.5 | 600 | 1.57 | 70 | 26 | 30 | 0.1–4 |
| 47 | Liquid rubber No. 7 | 70 | 500 | 1.31 | 24 | 1.7 | 60 | 1.06–6 |
| 48 | Liquid rubber No. 8 | 70 | 600 | 1.57 | 50 | 56 | 20 | 0.1–4 |

* Viscosity at the granulation temperature.

EXAMPLE 12

In the mixer of Example 1, 400 ml of water and 30 g of carbon black in the form of HAF hard beads were charged and stirred at 8000 r.p.m. for 1 hour to obtain an aqueous carbon black slurry. 100 g of Liquid rubber No. 1 (R-45HT) was added to the aqueous carbon black slurry with stirring. Five minutes after adding the Liquid rubber No. 1, the stirring was stopped. All of the carbon black was transferred to the Liquid rubber phase. The water phase was separated and the polymer containing carbon black was taken up and dried at 70°C under a reduced pressure of 20 mmHg for 30 minutes by a thin film type dryer. The dispersing degree of the carbon black in the composition was 100%.

Reference 1

A 50 g amount of the carbon black composition of Example 12, 2.84 g of tolylenediisocyanate and 0.05 g of dibutyl-tin-dilaurate were mixed and the mixture was molded in a mold and was pressed at 100°C for 1 hour to obtain a cured product. The properties of the cured product are shown in Table 12 together with the cured product of Reference 2.

EXAMPLE 13

The process of Example 12 was followed except that 100 g of hot Liquid rubber No. 4(R-45HT hydrogenated) was added to a carbon black slurry containing 20 g of carbon black of HAF and mixed at 8,000 r.p.m.. Five minutes after the addition the stirring was stopped. All of the carbon black was transferred to the polymer phase (R-45HT hydrogenated). The polymer containing carbon black was separated and dried by the process of Example 12. The dispersion rate of the carbon black in the composition was 100%.

Reference 2

The process of Reference 1 was followed to obtain a cured product using the composition of carbon black and liquid rubber of Example 13.

TABLE 12

|  | TES (kg/cm²) | EL (%) | HD (JIS) |
|---|---|---|---|
| Reference 1 | 113 | 505 | 62 |
| Reference 2 | 76.2 | 294 | 72 |

EXAMPLE 14

The process of Example 6 was followed except that the mixture was obtained at 4,000 r.p.m. The composition of carbon black and liquid rubber was not granulated but was in the form of a paste. (carbon black: Liquid rubber No. 1 = 50:100)

EXAMPLE 15–16

The process of Example 1 was followed by stirring a mixture of 50 parts of the aqueous carbon black slurry of Example 1 and 100 parts of Liquid rubber No. 2(CN-15) (Example 15) or Liquid rubber No. 3 (CS-15) (Example 16) at 10,000 r.p.m.. The compositions of carbon black and liquid rubber were not granulated but were in the form pasty mass. The degree of dispersion of carbon black in the paste was 99.9%, however, the handling of the paste product was more difficult than when in granular form.

Reference 3

Each of the past compositions of carbon black of Examples 14–16 were admixed with 7.7 parts of 80 TDI (tolylenediisocyanate) (—NCO/OH—1.1) per 100 parts of Liquid rubber. The mixtures were molded in a mold for the ASTM tensile strength test and were cured at 100°C for 90 minutes under a pressure of 20 kg/cm$^2$ to obtain the cured product. The properties of the cured products are shown in Table 13.

TABLE 13

Properties of Cured Product:

| Composition of carbon black | TES (kg/cm$^2$) | Properties of the cured product | | Degree of dispersion of carbon black (%) |
| --- | --- | --- | --- | --- |
| | | EL(%) | HD (JIS) | |
| Exp. 14 | 30 | 92 | 340 | 62 | 100 |
| Exp. 15 | 50 | 166 | 270 | 78 | 100 |
| Exp. 16 | 50 | 164 | 490 | 77 | 100 |

Comparative Test 1

A composition of carbon black and liquid rubber was prepared by kneading a mixture of 100 g of Liquid rubber No. 1(R-45HT) and 30 g of carbon black HAF by the conventional dry blend method of passing the mixture through a three roller mill having a slit gap of 0.15 mm (4 inch rollers) twice. The degree of dispersion of carbon black in the composition was 74.6%.

Reference 4

The process of Reference 1 was followed except that the composition of carbon black and liquid rubber of Comparative Test 1 was used to obtain a cured product. The properties of the cured product are shown in Table 14. As shown in Table 14, both the degree of dispersion of carbon black and the mechanical properties of the cured product were inferior.

TABLE 14

Properties of Cured Product:

| | Preparation of composition of carbon black | TES (kg/cm$^2$) | EL (%) | HD (JIS) |
| --- | --- | --- | --- | --- |
| Reference 4 | Example 12 carbon black: LR No. 1 = 30 : 100 dispersing rate 100% | 113 | 505 | 62 |
| Comparative Test 1 | Comparative Test 1 carbon black : LR No. 1 - 30 : 100 dispersing rate 74.6% | 70 | 270 | 61 |

Comparative Test 2 and Reference 5

In Comparative Test 1, the dry blend with the three roller mill was repeated ten times for about 1 hour (total 12 times) whereby a composition of carbon black having a degree of dispersion of 100% was obtained. The composition of carbon black and liquid rubber was then cured by the process of Reference 1 and the properties of the cured product were measured. The results are substantially the same as those of Reference 4.

It is possible to obtain a desirable composition of carbon black and Liquid rubber having a high dispersing rate by the dry blend method if the mixture is passed many times thru the mill and the properties of the cured product were substantially the same as those of the compositions of the invention. However, the dry blend method is much more complicated in operation.

Reference 6

The two types of granular compositions prepared by the process of Example 3 (100 parts or 150 parts of carbon black to 100 parts of Liquid rubber No. 1) (R-45HT) were respectively diluted with Liquid rubber No. 1 in a multi-purpose mixer and were dried by the process of Example 1 so as to obtain 30 parts of carbon black to 100 parts of LR. The diluted composition was cured by the process of Reference 3. The properties of the cured product are shown in Table 15.

TABLE 15

| Carbon black (100 parts to 100 parts of LR) | | Properties of cured product using diluted composition | | | |
| --- | --- | --- | --- | --- | --- |
| before dilution | after dilution | TES (kg/cm$^2$) | EL (%) | HD (JIS) | Degree of dispersion (%) |
| 100 | 30 | 80 | 370 | 57 | 100 |
| 150 | 30 | 87 | 420 | 55 | 100 |

Reference 7

The two types of granular composition prepared by the process of Example 5 (100 parts of carbon black to 100 parts of Liquid rubber No. 2 (CN-15) or No. 3 (CS-15)), were respectively diluted with Liquid rubber No. 2 or No. 3 and dried by the process of Example 1, resulting in a composition of 50 parts of carbon black to 100 parts of LR. The diluted composition was cured by the process of Reference 3. The properties of the cured products are shown in Table 16.

TABLE 16

Properties of cured product:

| Carbon black (parts to 100 parts of LR) | | Properties of cured product using diluted composition | | | |
|---|---|---|---|---|---|
| before dilution | after dilution | TES (kg/cm$^2$) | EL (%) | HD (JIS) | dispersing rate (%) |
| 100 | 50 | 168 | 320 | 74 | 100 |
| 100 | 50 | 165 | 500 | 74 | 100 |

Reference 7 also shows that a composition containing a high content of carbon black can be used as a master batch.

Reference 8

100 g of Liquid rubber No. 1, 1.0 g of antioxidant and 0.10 g of dibutyl-tin-dilaurate were mixed and 30 g of carbon black HAF hard beads were added to them and the mixture was passed through a three roller mill having a slit gap of 0.1 mm (4 inch rollers) for 6 times to disperse the carbon black so as to obtain a paste composition of carbon black having a degree of dispersion of 100%. The paste composition was admixed with 7.7 parts of 80 TDI (tolylenediisocyanate) (—NCO/OH—1.1) per 100 parts of LR. The mixture was molded in a mold for ASTM tensile strength tests and was cured at 100°C for 90 minutes under a pressure of 20 kg/cm$^2$, to obtain a cured product. The properties of the cured product are shown in Table 17.

Reference 9

The process of Example 14 was followed using 30 parts of carbon black to 100 parts of Liquid rubber No. 1(R-45HT), to obtain a composition of carbon black in the form of a paste. The composition was cured by the process of Reference 8 and the properties of the cured product were measured. The results are shown in Table 17.

TABLE 17

Properties of cured product:

| | Properties of cured product | | | |
|---|---|---|---|---|
| | TES (kg/cm$^2$) | EL (%) | HD (JIS) | Note |
| Reference 8 | 92 | 340 | 62 | dry blend(conventional method) |
| Reference 9 | 97 | 335 | 61 | wet blend paste (invention) |

Reference 10

The granular composition of carbon black and the liquid rubber of Example 6 (no. 21 100 parts of Liquid rubber and 50 parts of carbon black Vt - 1.57) was diluted with Liquid rubber No. 1 in a multi-purpose mixer and was dried to decrease the content of carbon black from 50 parts to 30 parts. The diluted composition was cured by the process of Reference 8. The granular composition of carbon black and liquid rubber of Example 7 (No. 30 100 parts of Liquid rubber No. 1 and 70 parts of carbon black Vt = 1.57) was diluted and then the diluted composition was cured by the same process. The granular composition of carbon black and liquid rubber of Example 7 (No. 25 100 parts of Liquid rubber No. 1 and 30 parts of carbon black Vt - 1.57) was cured without any dilution. The results are shown in Table 18.

TABLE 18

Properties of cured product:

| Carbon black (parts to 100 parts of LR) | | Properties of cured product | | |
|---|---|---|---|---|
| before dilution | after dilution | TES (kg/cm$^2$) | EL (%) | HD (JIS) |
| 50 | 30 | 83 | 375 | 54 |
| 70 | 30 | 95 | 394 | 56 |
| 30 | 30 | 97 | 396 | 57 |

As shown in Tables 17 and 18, when the compositions of carbon black prepared by the dry blend method using a three roller mill (conventional method), the paste composition of the present invention, the diluted composition from the granular composition of the present invention and the composition of the present invention prepared without dilution are used for the preparation of each cured product, the properties of the cured products are substantially same. When the granular composition of carbon black and the liquid rubber of the present invention is used for the preparation of a cured product, the properties of the cured product are as satisfactory as the products prepared by the conventional kneading process which requires kneading for a long time.

Having now fully described the invention, it will be apparent to one of ordinary skill in the art that many changes and modifications can be made thereto without departing from the spirit or scope of the invention as set forth herein.

What is claimed as new and desired to be secured by Letters Patents of the United States is:

1. A process for preparing a liquid rubber-carbon black composition which comprises mixing 30–300 parts by weight of carbon black in the form of an aqueous carbon black slurry with 100 parts by weight of a liquid conjugated diene, copolymerized diene rubber or polysulfide rubber having a molecular weight of from 500–30,000 and a viscosity at 24°–100°C of from 0.3–1000 poise with stirring said carbon black composition being prepared by effectively utilizing water as a medium for the uniform mixing of said rubber and said carbon black.

2. The process of claim 1, wherein said liquid rubber is a conjugated diene type polymer which is fluid at a temperature of less than 100°C.

3. The process of claim 1, wherein a granular composition of carbon black and liquid rubber is obtained.

4. The process of claim 1, wherein 80–300 parts by wt. of carbon black in the form of a carbon aqueous slurry is mixed with 100 parts by wt. of liquid rubber so as to form a granular composition of carbon black and liquid rubber.

5. The process of claim 1, wherein said carbon black composition is dried.

6. The process of claim 1, wherein said carbon black composition is diluted by a liquid rubber.

7. The process of claim 1, wherein said aqueous carbon black slurry contains 2–30 wt. % of carbon black.

8. The process of claim 3, wherein said liquid rubber of a conjugated diene type polymer has at least one functional group.

9. The process of claim 3, wherein the aqueous carbon black slurry containing 30–80 parts by wt. of carbon black is mixed with 100 parts by wt. of liquid rubber and the mixture is stirred under moderate shearing conditions by a stirrer having a peripheral speed of 0.9–6.0 m/sec.

10. The process of claim 3, wherein said granular composition of carbon black and liquid rubber is dried.

11. The process of claim 3, wherein said liquid rubber is a conjugated diene polymer.

12. The process of claim 5, wherein said carbon black composition is dried by using a liquid surface refreshing type evaporator.

13. The process of claim 1, wherein the aqueous carbon black slurry is mixed by a stirrer having a peripheral speed of from 0.9–6.0 m/sec with the liquid rubber, so as to form a paste or granular composition of carbon black and liquid rubber.

* * * * *